May 6, 1930. G. F. DILLOW 1,757,656
COOKING UTENSIL
Filed May 7, 1928

INVENTOR
George F. Dillow
BY
Pierre Barnes
ATTORNEY

Patented May 6, 1930

1,757,656

UNITED STATES PATENT OFFICE

GEORGE F. DILLOW, OF SEATTLE, WASHINGTON

COOKING UTENSIL

Application filed May 7, 1928. Serial No. 275,667.

This invention relates to cooking utensils and more especially to pans for use in baking pies.

The object of the invention, generally stated, is to provide a pan of this character which is divided by a novel arrangement of partitions into compartments in order to produce a plurality of sector-shaped portions of pie which are adapted to be most conveniently removed from the pan.

More specific objects and advantages of the invention will appear in the following description.

The invention consists in the novel arrangement, adaptation and combination of parts hereinafter described and claimed.

In the accompanying drawing,—

Figure 1:
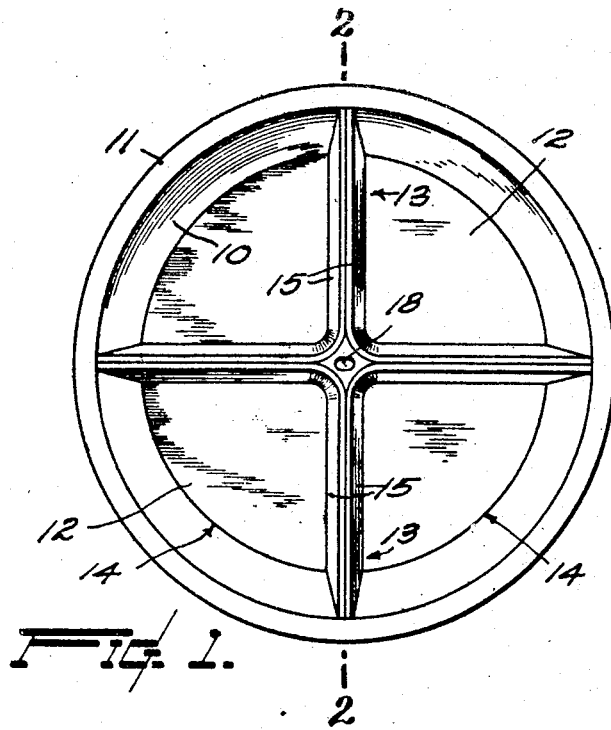
Figure 3:
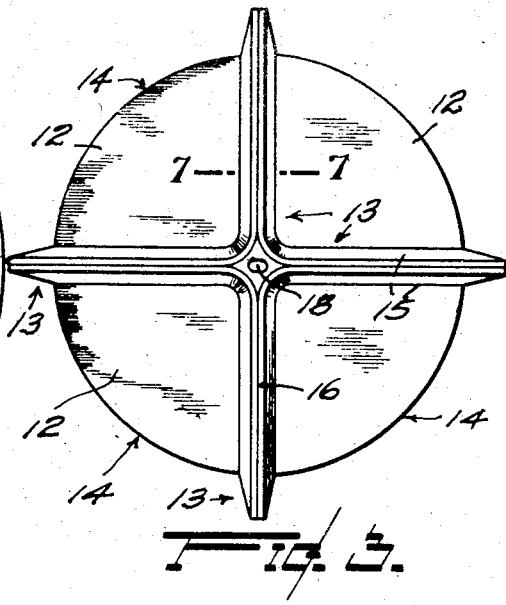
Figure 4:
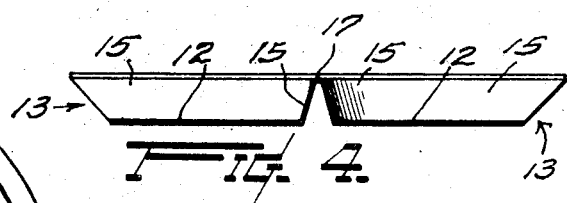
Figures 2, 5:
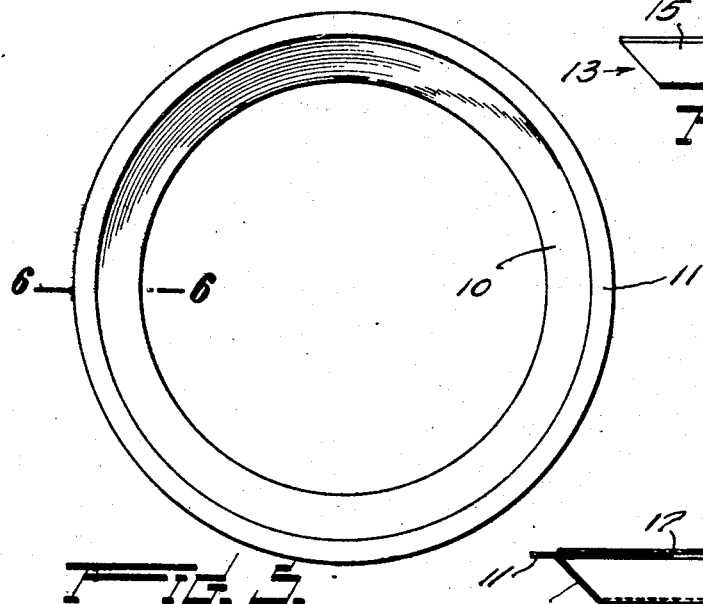
Figures 6, 7:
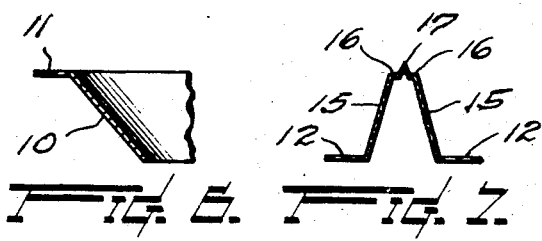

Figure 1 is a plan view of a bake pan embodying my invention; Fig. 2 is a transverse sectional view taken substantially on line 2—2 of Fig. 1; Fig. 3 is a plan view of the inner member of the pan shown separately; Fig. 4 is a front elevation of Fig. 3; Fig. 5 is a plan view of the outer member of the pan, shown separately; Fig. 6 is a detail sectional view on line 6—6 of Fig. 5; and Fig. 7 is a similar view on line 7—7 of Fig. 3.

According to the present invention a bake pan is formed of two parts. One of said parts, hereinafter designated as the outer member, is of an annular shape (Fig. 5) comprising a wall element 10 of an inverted truncated conical shape having a circumferential flange 11 about its upper edge. The other of said parts, hereinafter designated as the inner member, is of a general circular form comprising a plurality of sector shaped floor elements 12 between partitions 13 extending radially from the central portion of the inner member to the inner peripheral surface of the wall element 10 of the outer member.

The diameter of the circle of the arcuate edges of the floor elements 12 is such that said edges will fit against the lower portion of the peripheral surface of the wall element 10, and the outer extremities of said partitions are adapted to fit against such wall surface above the plane of the floor elements 12.

Said partitions are integral with the floor elements and may be produced by being pressed upwardly therefrom to provide a hollow section (Fig. 7) with upwardly converging side elements 15 which terminate in shoulders 16 in or about the plane of the upper edge of the wall flange 11.

The several partitions are, moreover, desirably provided with a central rib 17, which is utilized as a parting medium for separating pie-crusts. 18 represents an aperture, desirably oblong, provided in the central portion of the inner member to accommodate a prong of a fork, or other suitable instrument, for engaging the inner member for removing the latter and its contents from within the outer member.

For use, the two members of the pan are assembled, one within the other, as illustrated in Figs. 1 and 2. The dough for the lower crust or crusts is then spread over the pan and pressed downwardly into the several compartments between the successive partitions to bear against the exposed surfaces therein—that is to say, against both the floor elements 12 and the side elements 15 of the partitions of the inner member, and also against the wall elements 10 of the outer member. The filling for the pie is then deposited in the dough-lined compartments and is covered by a layer of dough for the upper crust or crusts. Thus formed the pan with its contents is placed in a stove oven for baking.

After removal from the oven the contents of the pan are removed therefrom upon the inner member by withdrawing the latter from the outer member, whereby the portions of the pie occupying the various compartments may be conveniently and individually removed from the inner member by means of a knife blade, or an equivalent, inserted between a bottom crust and the respective floor element 12.

What I claim, is,—

1. A cooking utensil consisting of an outer shell member of an inverted truncated conical shape, and an inner member consisting of a plurality of floor elements rigidly connected by partitions integral with said floor elements, the outer inclined ends of said partitions and the arcuate edges of the respective floor elements being adapted to rest against the inner peripheral surface of the outer member for supporting the inner member.

2. A cooking utensil consisting of an outer annular open bottom shell member of an inverted truncated conical shape and an inner member separately connected with the outer member, said inner member comprising alternating integral floor and partition elements arranged to rest within said wall member and divide the space therein circumferentially of the utensil into a plurality of sector-shaped compartments, each of said partitions being hollow with upwardly converging side wall elements.

3. A cooking utensil consisting of an annular outer open bottom shell member of an inverted truncated conical shape and an inner member separately connected with the outer member, said inner member comprising alternating floor and partition elements arranged to rest against the walls of said shell member and divide the space enclosed thereby into a plurality of sector shaped compartments and ridges provided upon said inner member radially of the center thereof to serve as a parting medium for dividing pie crust.

Signed at Seattle, Washington, this 19th day of April, 1928.

GEORGE F. DILLOW.